United States Patent
Lefebvre et al.

(10) Patent No.: US 11,506,080 B2
(45) Date of Patent: Nov. 22, 2022

(54) GAS TURBINE ENGINE PROBE COOLING

(71) Applicant: PRATT & WHITNEY CANADA CORP., Longueuil (CA)

(72) Inventors: Guy Lefebvre, St-Bruno (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 237 days.

(21) Appl. No.: 17/062,005

(22) Filed: Oct. 2, 2020

(65) Prior Publication Data
US 2022/0106892 A1 Apr. 7, 2022

(51) Int. Cl.
| | |
|---|---|
| *F01D 25/18* | (2006.01) |
| *F01D 17/08* | (2006.01) |
| *F02C 7/06* | (2006.01) |
| *F01D 21/00* | (2006.01) |

(52) U.S. Cl.
CPC ......... *F01D 25/183* (2013.01); *F01D 21/003* (2013.01); *F02C 7/06* (2013.01); *F01D 17/085* (2013.01); *F05D 2220/329* (2013.01); *F05D 2240/55* (2013.01); *F05D 2250/312* (2013.01); *F05D 2260/20* (2013.01); *F05D 2260/98* (2013.01)

(58) Field of Classification Search
CPC ......... F01D 21/003; F01D 25/183; F02C 7/06
See application file for complete search history.

(56) References Cited

U.S. PATENT DOCUMENTS

| | | | | |
|---|---|---|---|---|
| 6,968,697 | B2* | 11/2005 | Nguyen | F02C 7/06 |
| | | | | 60/785 |
| 9,551,281 | B2* | 1/2017 | Lefebvre | F01D 17/24 |
| 11,339,679 | B1* | 5/2022 | Lefebvre | F01D 25/24 |
| 11,359,512 | B1* | 6/2022 | Turcotte | F02C 7/06 |
| 2003/0114267 | A1 | 6/2003 | Poulin et al. | |
| 2004/0037483 | A1 | 2/2004 | Beauvais | |
| 2005/0056019 | A1* | 3/2005 | Nguyen | F02C 7/06 |
| | | | | 60/726 |
| 2015/0198091 | A1* | 7/2015 | Lefebvre | F01D 17/24 |
| | | | | 165/104.33 |
| 2018/0306053 | A1 | 10/2018 | Chapman | |

FOREIGN PATENT DOCUMENTS

| | | |
|---|---|---|
| EP | 0539636 A1 | 5/1993 |
| EP | 3361057 A2 | 8/2018 |
| EP | 3361122 A1 | 8/2018 |

OTHER PUBLICATIONS

European Search Report issued in counterpart application 21200783.5 dated Jan. 24, 2022.

* cited by examiner

*Primary Examiner* — Topaz L. Elliott
(74) *Attorney, Agent, or Firm* — Norton Rose Fulbright Canada LLP.

(57) ABSTRACT

A gas turbine engine has a housing exposed to a high temperature environment. The housing has a circumferential wall extending around the engine centerline and circumscribing an oil cavity. The wall has a sealing interface at an inner diameter thereof, the sealing interface having a central axis offset from the engine centerline. A boss is formed on the wall on the offset side relative to the engine centerline and a probe is mounted to the boss. The probe projects into the oil cavity. The oil in the oil cavity thermally shields the probe from the high temperature environment.

18 Claims, 4 Drawing Sheets

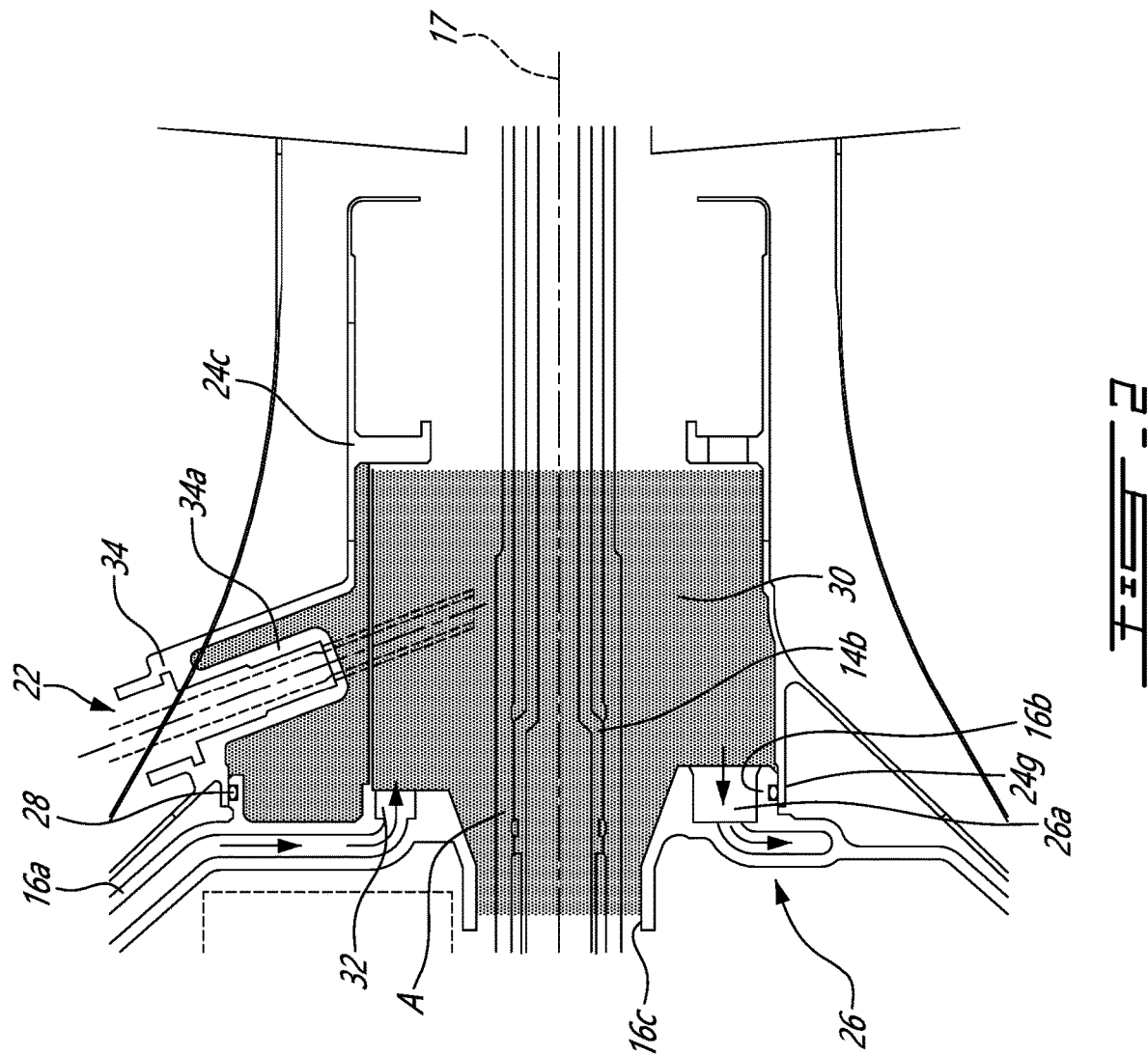

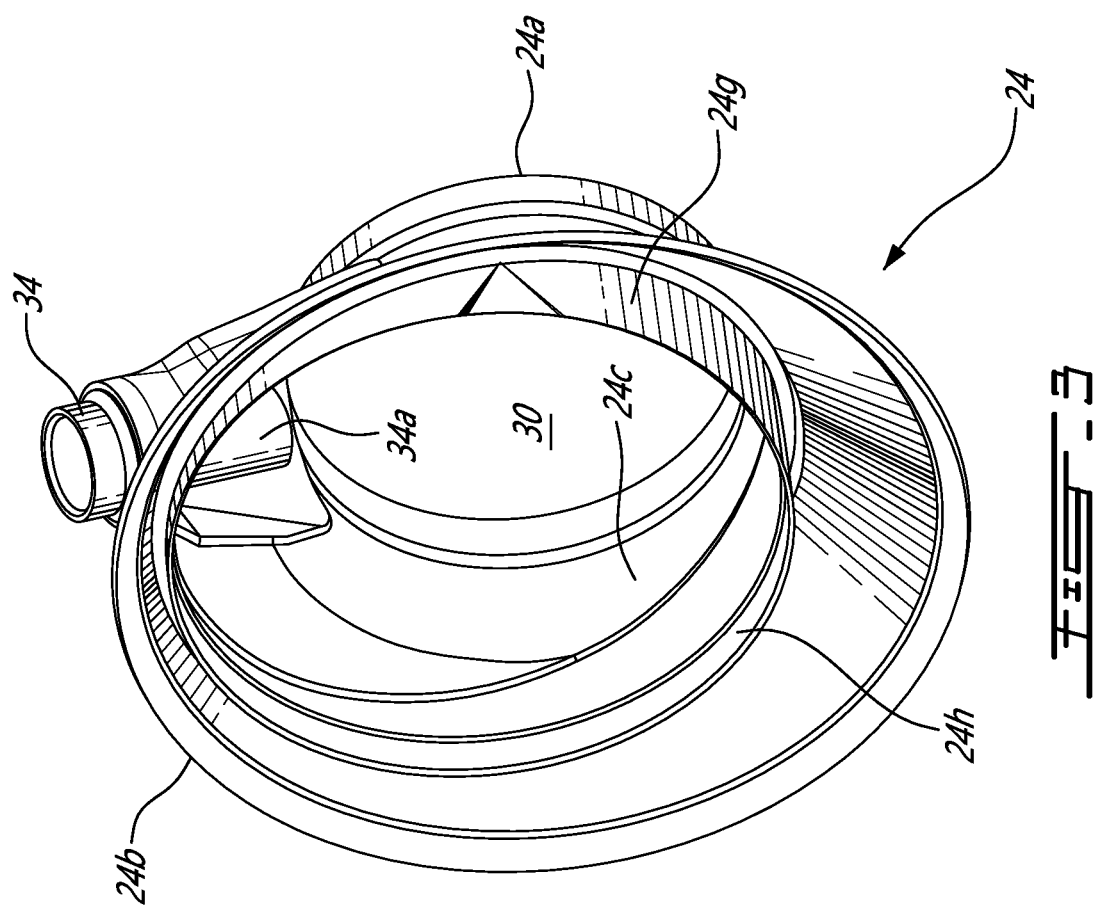

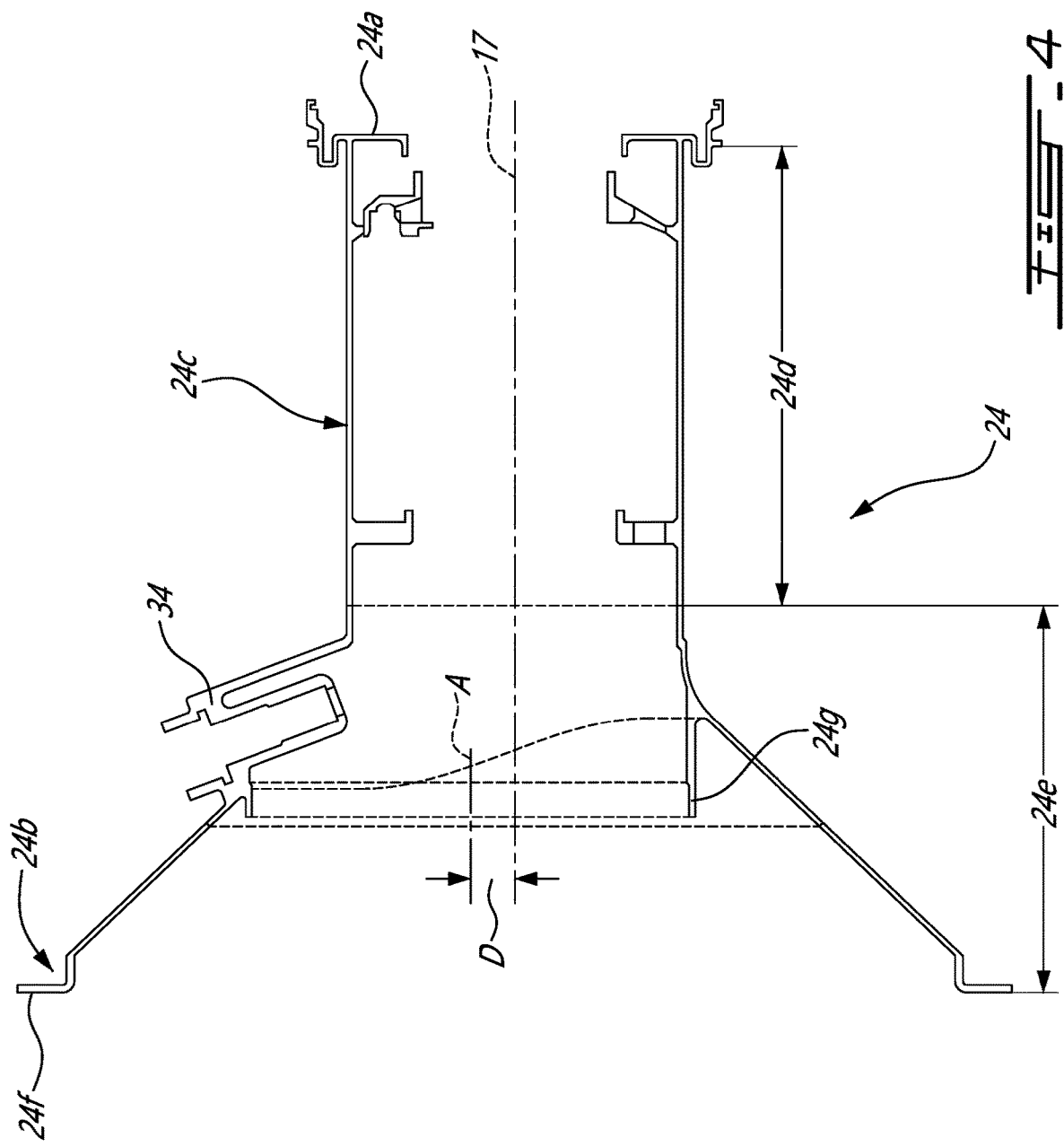

GAS TURBINE ENGINE PROBE COOLING

TECHNICAL FIELD

The application relates generally to gas turbine engines and, more particularly, to probe cooling in hot sections of gas turbine engines.

BACKGROUND OF THE ART

A gas turbine engine includes sections at low temperatures, namely cold section modules, and sections at high temperatures, namely hot section modules. The cold section modules include for example the compressor, while the hot section modules include for example, the combustor and the turbine. While some mechanical components may sustain the high temperatures of the hot section module, probes may not sustain these high temperatures, and their functioning could be altered by the hot ambient gases of the hot section modules.

SUMMARY

In one aspect, there is provided a gas turbine engine having an engine centerline, comprising: a hot section including: a housing exposed to a high temperature environment, the housing having a circumferentially extending wall extending around the engine centerline and circumscribing an oil cavity, the circumferentially extending wall having a sealing interface at an inner diameter thereof, the sealing interface having a central axis offset from the engine centerline, the housing further having a boss formed in a portion of said circumferentially extending wall on a side of the engine centerline corresponding to an offset between the central axis of the sealing interface and the engine centerline when viewed in an axial cross-section plane containing the engine centerline and the central axis; and a probe mounted to said boss, said probe projecting into the oil cavity so as to be surrounded with oil, the oil thermally insulating the probe from the high temperature environment.

In another aspect, there is provided a probe mounting arrangement for use in a hot section of a gas turbine engine having an engine centerline, the probe mounting arrangement comprising: a housing having a circumferentially extending wall circumscribing an oil cavity having a first end coaxial to said engine centerline and a second end having a central axis offset from said engine centerline, the circumferentially extending wall having a boss formed thereon at said second end, the boss having a tubular body projecting into the oil cavity, the tubular body exposed to oil in the oil cavity; and a probe protruding through said tubular body into the oil cavity.

In a further aspect, there is provided a method of cooling a probe in a hot section of a gas turbine engine having an engine centerline, the method comprising: mounting the probe in a boss formed on a circumferentially extending wall of an oil cavity through which a turbine shaft extends, the probe having a tubular body projecting inwardly into the oil cavity.

DESCRIPTION OF THE DRAWINGS

Reference is now made to the accompanying figures in which:

FIG. 2 is an enlarged axial cross-section view of a power turbine housing illustrating an off-centered oil cavity having a front sealing interface extending about a central axis offset from the centerline of the engine, the housing having a boss protruding into the oil cavity for thermally shielding a power turbine probe;

FIG. 3 is an isometric view of the power turbine housing illustrating the off-centered oil cavity with an eccentric O-ring groove at the front sealing interface; and FIG. 4 is an axial cross-section view of the power turbine housing taken in a plane containing the engine centerline and the central axis of the "off-centered" oil cavity.

DETAILED DESCRIPTION

Figure 1:
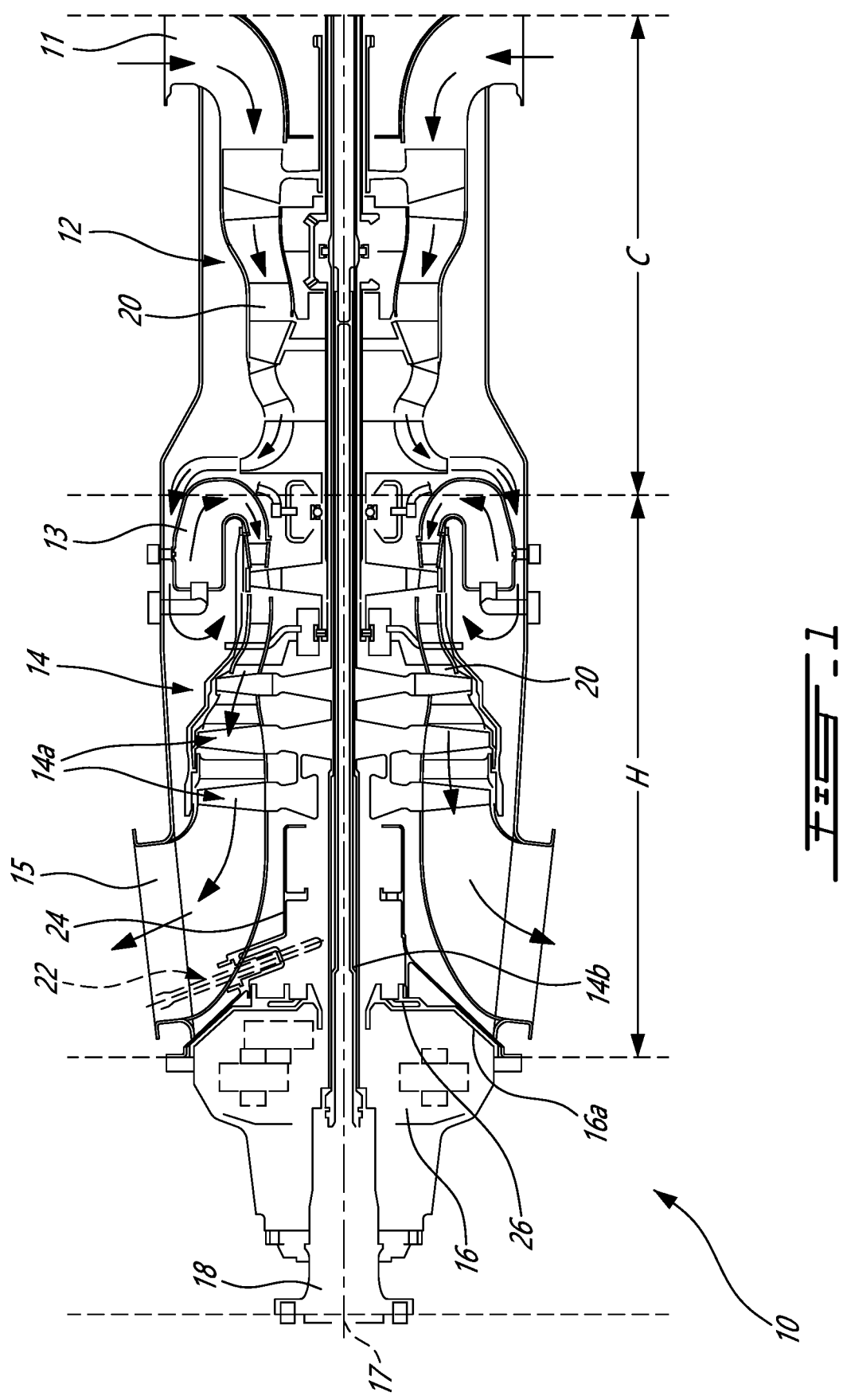
FIG. 1 is a schematic longitudinal/axial cross-section view of a boosted reverse flow gas turbine engine.

FIG. 1 illustrates a gas turbine engine 10 of a type preferably provided for use in subsonic flight, generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. The turbine 14 includes a low pressure or power turbine 14a drivingly connected to an input end of a fully enclosed reduction gearbox RGB 16. The RGB 16 has an output end drivingly connected to an output shaft 18 configured to drive a rotatable load (not shown). The rotatable load can, for instance, take the form of a propeller or a rotor, such as a helicopter main rotor. The gas turbine engine 10 has an engine centerline 17. According to the illustrated embodiment, the compressor and the turbine rotors are mounted in-line for rotation about the engine centerline 17.

The gas turbine engine 10 has an axially extending central core which defines an annular gaspath 20 through which gases flow, as depicted by flow arrows in FIG. 1. The exemplary embodiment shown in FIG. 1 is a "reverse-flow" engine because gases flow through the gaspath 20 from the air inlet 11 at a rear portion thereof, to the exhaust 15 at a front portion thereof. According to one aspect, the engine 10 can have an engine architecture corresponding to that of the engine described in applicant's U.S. Pat. No. 10,393,027 issued on Aug. 27, 2019, the entire content of which is herein incorporated by reference.

Still referring to FIG. 1, it can be seen that the engine 10 has a cold section C that is under a "relatively" cold ambient temperature. The cold section C includes the air inlet 11 and the compressor 12. The engine 10 also has a hot section H, which in use, is subject to high temperatures. The hot section H includes the combustor 13, the turbine 14 and the exhaust 15. For instance, the temperatures inside the turbine 14 are typically in excess of 1000 degree. C. In use, the continuous flow of gas to which a turbine is exposed can be at a temperature up to 1700 degree. C.

The engine 10 is equipped with a plurality of probes (sensors) for measuring various operating parameters, such as torque, speed, distance, temperature, pressure etc. Some of these probes are disposed in the hot section H of the engine 10. Accordingly, these probes need to be able to cope with the high temperatures prevailing in the hot section H of the engine 10. It may thus be necessary to thermally shield the probes in order to maintain the temperature of the probes within acceptable limits. FIG. 1 illustrates an example of such a thermally shielded probe. More particularly, FIG. 1 illustrates a power turbine probe 22 mounted to the power turbine housing 24 next to the engine exhaust 15 for measuring an operating parameter (e.g. speed and/or torque) of the power turbine 14a.

As shown in FIG. 2, the housing 24 is configured to allow the probe 22 to be surrounded by a body of oil so as to thermally shield the probe 22 from the hot exhaust gases flowing through the engine exhaust 15. In practice, the positioning of the probe is limited by several physical constrains, such as the position of the engine structures interfacing with the housing 24 and the space available for accommodating the probe next to the engine structure to be monitored. For instance, according to the illustrated embodiment, the housing 24 interfaces with the RGB 16 and is connected to an oil scavenge system 26 having a scavenge port 26a located at a predetermined position at the bottom dead center of the power turbine housing 24. Also, the housing must align with the power turbine spool, which is coaxial to the engine centerline 17. These structural constrains limit the options available to mount and position the probe 22 to the power turbine housing 24. As will be seen herein after, the power turbine housing 24 has an "off-centered" oil cavity to allow the probe 22 to be surrounded with oil without compromising the positioning and configuration of the oil scavenge system 26.

Referring concurrently to FIGS. 3 and 4, it can be seen that the housing 24 has a circumferentially extending wall 24c extending axially from an upstream end 24a to a downstream end 24b relative to the flow of gases flowing through the gas path 20. The upstream and downstream ends 24a, 24b are centered relative to the engine centerline 17. The circumferentially extending wall 24c has a cylindrical portion 24d extending forwardly from the upstream end 24a. The bearings (not shown) supporting the power turbine 14a are disposed in this section of the power turbine housing 24. The cylindrical portion 24d merges into a conical portion 24e at a location intermediate the upstream and downstream ends 24a, 24b. The conical portion 24e terminates into a radially outer annular flange 24f at the downstream end 24b of the housing 24. As shown in FIG. 1, the annular flange 24f is bolted or otherwise suitably secured to a corresponding flange extending radially outwardly from the enclosure/casing of the RGB 16.

As best shown in FIG. 2, the RGB enclosure comprises a rear cover 16a having a circular flange 16b projecting axially rearwardly therefrom for sealing engagement with a corresponding sealing interface 24g at an inner diameter of the circumferentially extending wall 24c of the power turbine housing 24. According to the illustrated embodiment, the flange 16b of the cover 16a carries an O-ring 28 for sealing engagement in a corresponding O-ring groove 24h (FIG. 3) defined in the sealing interface 24g of the circumferentially extending wall of the housing 24. As shown in FIGS. 2-4, the sealing interface 24g may be provided in the form of an annular inner shoulder projecting axially from an inner surface of the conical portion 24e of the housing for axial engagement over the circular flange 16b of the RGB cover 16a. As depicted by the array of dots in FIG. 2, the sealing interface between the cover 16a and the housing 24 seals an end of an oil cavity 30 fluidly connected to a source of oil via an oil supply 32 to provide lubricating to the bearings (not shown) supporting the power turbine 14a. As shown in FIG. 2, the oil cavity 30 is fluidly connected to the RGB 16 via a shaft opening 16c defined in the cover 16a for receiving the power turbine shaft 14b. It can be appreciated from FIG. 2 that the power turbine shaft 14b and the shaft opening 16c in the cover 16a are axially aligned with the engine centerline 17. In practice, oil will flow from the RGB 16 to the oil cavity 30 before being evacuated via the scavenge oil port 26a of the scavenge oil system 26.

Now referring concurrently to FIGS. 2 and 4, it can be appreciated that the sealing interface 24g extends about a central axis A that is offset from the engine centerline 17 by a distance D. This provides the required room to position the probe at a top side of the housing 24 into the oil cavity 30 in order to thermally shield the probe 22 without affecting the bearing housing scavenge sump system 26 at the bottom dead center of the housing 24. In other words, it provides for an off-centered oil cavity 30 with an offset in an upward direction sufficient so that the probe 22 be accommodated in the oil cavity 30 circumscribed by the circumferential wall of the housing 24.

As shown in FIGS. 1-4, the probe 22 can be mounted in a boss 34 provided at the beginning of the conical section 24e axially adjacent to the sealing interface 24g. The boss 34 is formed in a portion of the circumferentially extending wall 24c on a side of the engine centerline 17 corresponding to the offset D between the central axis A of the sealing interface 24g and the engine centerline 17 when viewed in an axial cross-section plane containing the engine centerline 17 and the central axis A as for instance shown in FIG. 4. It is understood that depending on the application, the side on which the boss 34 is provided is not necessarily the top side of the housing as described above.

The exemplified boss 34 has an open ended tubular body 34a projecting inwardly into the oil cavity 30. As best shown in FIG. 2, the tubular body 34a is spaced from the wall 24c of the housing 24 so as to be exposed to the oil on all side (360 degrees exposure). In other words, the tubular body 34a is surrounded by an annulus of oil. The probe 22 extends through the tubular body 34 into the oil cavity 30 to a location next to the power turbine shaft 14b. Indeed, as can be appreciated from FIG. 2, the tip of the probe 22 is disposed beyond the inwardly protruding tubular body 34a of the boss 34 adjacent to the power turbine shaft 14b in the oil cavity 30.

The boss 34 can be integrated in an annular casting welded or otherwise assembled to the other sections of the housing 24. Alternatively, the housing 24 with the boss 34 could be made from stamp sheet metal, machined from solid material or made by 3D printing technologies, such as additive manufacturing.

In operation, cool oil is directed into the oil cavity 30 via the oil supply 32. The oil provides lubrication to the bearings (not shown) mounted in the power turbine housing 24 for supporting the power turbine 14a. As the power turbine shaft 14b rotates, it causes the oil to splash against the inner surface of the circumferentially extending wall 24c and, thus, against the tubular body 34a of the boss 34. The rotation of the gears in the RGB 16 also produces oil mist that leaks through the shaft opening 16c of the RGB cover 16a to impinge upon the outer surface of the tubular body 34a and the probe 22. The oil around the tubular body 34a of the boss 34 thermally shield the probe 22 from the heat transferred to the turbine housing 24 by the flow of combustion gases prior to being exhausted via exhaust 15.

It can be appreciated that at least in some aspects, the off-centered configuration of the oil cavity 30 allows a probe installation in the power turbine housing 24 without introducing additional complexity in the engine architecture. It provides for a cooler temperature environment for the probe 22 without affecting the position of the oil scavenge system 26.

The above description is meant to be exemplary only, and one skilled in the art will recognize that changes may be made to the embodiments described without departing from the scope of the invention disclosed. For instance, while the probe installation has been described in the context of a turboprop/turboshaft engine architecture, it is understood that it could be applied to other engines, including turbofan and auxiliary power unit (APU) engines. Also, while the exemplified probe is installed on the power turbine housing, it is understood that it could be installed on other structures of the hot section of the gas turbine engine. Also, it is understood that the present disclosure is not limited to speed or torque probes. Other modifications which fall within the scope of the present invention will be apparent to those skilled in the art, in light of a review of this disclosure, and such modifications are intended to fall within the appended claims.

The invention claimed is:

1. A gas turbine engine having an engine centerline, comprising:
a hot section including:
a housing exposed to a high temperature environment, the housing having a circumferentially extending wall extending around the engine centerline and circumscribing an oil cavity, the circumferentially extending wall having a sealing interface at an inner diameter thereof, the sealing interface having a central axis offset from the engine centerline, the housing further having a boss formed in a portion of said circumferentially extending wall on a side of the engine centerline corresponding to an offset between the central axis of the sealing interface and the engine centerline in an axial cross-section plane; and
a probe mounted to said boss, said probe projecting into the oil cavity so as to be surrounded with oil, the oil thermally insulating the probe from the high temperature environment.

2. The gas turbine engine according to claim 1, further comprising an oil scavenge port, the oil scavenge port being provided on a side of the engine centerline opposite to the side on which the boss is disposed, the oil scavenge port being closer to the engine centerline than the boss.

3. The gas turbine engine according to claim 2, wherein the boss and the oil scavenge port are respectively provided at a top end and a bottom end of the housing, the top end being farther from the engine centerline than the bottom end.

4. The gas turbine engine according to claim 1, wherein the sealing interface sealingly cooperates with a cover of a reduction gearbox (RGB), the cover having an annular sealing flange eccentrically disposed relative to the engine centerline.

5. The gas turbine engine according to claim 4, wherein said sealing interface includes an O-ring groove defined in said inner diameter of the circumferentially extending wall, the O-ring groove being off-centered relative to the engine centerline.

6. The gas turbine engine according to claim 1, wherein the boss has a tubular body projecting into the oil cavity, the probe extending through said tubular body into the oil cavity to a location next to a power turbine shaft.

7. The gas turbine engine according to claim 6, wherein the oil cavity defines an annulus around the tubular body.

8. The gas turbine engine according to claim 1, wherein the housing is a power turbine housing disposed next to an engine exhaust, and wherein the sealing interface is sealingly engaged with an annular flange projecting axially from a cover of a reduction gearbox (RGB).

9. The gas turbine engine according to claim 8, wherein the oil cavity is fluidly connected to the reduction gearbox (RGB) via a shaft opening defined in the cover, the shaft opening coaxial to the engine centerline.

10. The gas turbine engine according to claim 1, wherein the gas turbine engine includes a power turbine having a power turbine shaft extending axially through the oil cavity, the probe having a tip disposed next to the power turbine shaft, wherein the power turbine shaft is offset relative to the central axis of the sealing interface of the housing.

11. The gas turbine engine according to claim 1, wherein the housing has first and second axially spaced-apart ends coaxial to the engine centerline, and wherein the sealing interface is axially disposed at an intermediate location between said first and second axially spaced-apart ends.

12. A probe mounting arrangement for use in a hot section of a gas turbine engine having an engine centerline, the probe mounting arrangement comprising:
a housing having a circumferentially extending wall circumscribing an oil cavity having a first end coaxial to said engine centerline and a second end having a central axis configured to be offset from said engine centerline, the circumferentially extending wall having a boss formed thereon at said second end, the boss having a tubular body projecting into the oil cavity, the tubular body exposed to oil in the oil cavity; and
a probe protruding through said tubular body into the oil cavity.

13. The probe mounting arrangement according to claim 12, wherein the circumferentially extending wall has a sealing interface at an inner diameter of said second end, the sealing interface configured to be eccentrically disposed relative to the engine centerline.

14. The probe mounting arrangement according to claim 13, wherein the sealing interface includes an O-ring groove defined in said inner diameter of the circumferentially extending wall, the O-ring groove configured to be off-centered relative to the engine centerline.

15. The probe mounting arrangement according to claim 12, wherein the oil cavity defines an annulus around the tubular body.

16. The probe mounting arrangement according to claim 13, wherein the housing is a power turbine housing, and wherein the sealing interface is sealingly engaged with an annular flange projecting axially from a cover of a reduction gearbox (RGB).

17. The probe mounting arrangement according to claim 12, wherein the boss is provided in a portion of said circumferentially extending wall on a side of the engine centerline corresponding to an offset between the central axis of the second end and the engine centerline when viewed in an axial cross-section plane.

18. The probe mounting arrangement according to claim 17, wherein the boss is provided on a top portion of the circumferentially extending wall.

* * * * *